US006722829B2

(12) United States Patent
Williams

(10) Patent No.: US 6,722,829 B2
(45) Date of Patent: Apr. 20, 2004

(54) ADJUSTABLE FREIGHT GATE ASSEMBLY

(76) Inventor: David Locke Williams, 6248 US Hwy. 21, Jonesville, NC (US) 28642-8469

( * ) Notice: Subject to any disclaimer, the term of this patent is extended or adjusted under 35 U.S.C. 154(b) by 0 days.

(21) Appl. No.: 10/174,125

(22) Filed: Jun. 18, 2002

(65) Prior Publication Data

US 2003/0231938 A1 Dec. 18, 2003

(51) Int. Cl.⁷ .................................................. B60P 7/15
(52) U.S. Cl. ........................ 410/139; 410/143; 410/132; 410/135; 410/150; 410/129; 410/130
(58) Field of Search ................................ 410/132, 143, 410/133, 135, 150, 121, 129, 130, 139, 141, 142; 220/534, 542, 545, 546; 248/354.1

(56) References Cited

U.S. PATENT DOCUMENTS

| | | | |
|---|---|---|---|
| 2,468,101 A | * 4/1949 | Nampa | 410/150 |
| 4,141,582 A | 2/1979 | Streeter | |
| 4,568,237 A | 2/1986 | Krause et al. | |
| 4,652,042 A | 3/1987 | Bader | |
| 4,702,653 A | * 10/1987 | Gaulding et al. | 410/144 |
| 4,762,345 A | 8/1988 | Stluka et al. | |
| 5,085,326 A | 2/1992 | Russell et al. | |
| 5,411,355 A | * 5/1995 | Gosnell et al. | 410/139 |
| 5,427,487 A | * 6/1995 | Brosfske | 410/121 |
| 5,586,850 A | 12/1996 | Johnson | 410/138 |
| 5,597,193 A | 1/1997 | Conner | |
| 5,688,087 A | * 11/1997 | Stapleton et al. | 410/150 |
| 5,692,788 A | 12/1997 | Costa | |
| 5,800,111 A | 9/1998 | Tetz et al. | |
| 5,803,295 A | 9/1998 | Tussey | |
| 6,024,155 A | 2/2000 | Sharp | |
| 6,053,554 A | 4/2000 | Doniaz | |
| 6,074,143 A | * 6/2000 | Langston et al. | 410/89 |
| 6,086,299 A | * 7/2000 | Kanczuzewski | 410/152 |
| 6,135,527 A | 10/2000 | Bily | |
| 6,174,116 B1 | 1/2001 | Brand | 410/140 |
| 6,206,624 B1 | * 3/2001 | Brandenburg | 410/132 |
| 6,364,583 B1 | * 4/2002 | Koller | 410/89 |

FOREIGN PATENT DOCUMENTS

| | | | | |
|---|---|---|---|---|
| DE | 1217923 | * | 6/1966 | 220/542 |

* cited by examiner

Primary Examiner—Stephen T. Gordon
(74) Attorney, Agent, or Firm—Harleston Law Firm LLC; Kathleen M. Harleston

(57) ABSTRACT

A freight gate assembly (10) for retaining freight in a trailer (11) or van includes:

(a) a track system (12) including at least two matching tracks (18), each of the tracks being affixable to opposite, longitudinal side walls (19) of the trailer, each of the tracks (18) including a longitudinally oriented channel (24) and a plurality of spaced-apart, substantially same-sized notches (25), the notches (25) being accessible from the channel (24); and (b) a freight gate restraining system (13) including at least one adjustable gate rail (32), each gate rail (32) having a first end including a latching mechanism (33) for detachably latching the first end of the gate rail (32) to a first one of the tracks (18) by means of the notches, and an opposite, second end including a joint mechanism (34) that is slidably movable along the second track by means of the notches (25) in the second track (18);

wherein the adjustable gate rail (32) is substantially perpendicular to the tracks (18) when it is in a closed position for restraining freight; and wherein each track (18) is longer than the length of the gate rail (32) and shorter than the length of the trailer (11). An alternate embodiment (50) having a double gate arm (51, 52) is also included herein.

22 Claims, 10 Drawing Sheets

ADJUSTABLE FREIGHT GATE ASSEMBLY

BACKGROUND OF THE INVENTION

1. Technical Field

The present invention relates to an adjustable gate assembly for securing and retaining freight in a tractor trailer, freight van, or the like.

2. Background Information

Many tractor trailer drivers, carrier companies, and distribution centers have a problem with loads of freight shifting around in the trailer during transportation. With full or partial loads, gaps, improper loading, and double stacked pallets can cause the goods in the load to break or otherwise sustain damage, and people unloading the trailer ("unloaders") can be injured. Those responsible for loading a trailer often improperly secure the load, or even fail to secure it at all, which is a danger to the tractor trailer driver, the unloaders, policemen or others safety checking the trailer, as well as to the public along the route. A particular danger is present when the load has shifted against the tractor trailer door. When the door is opened, heavy items or hazardous materials can fall out and injure whoever is standing in front of the door. The same is true for dry freight vans.

Conventional means of restraining loads of freight, such as load bars, which are often left on docks, and restraining straps, which become tangled and lost, are inadequate. Many conventional means of restraining freight in tractor trailers can only be used during one trip. There is a need for a sturdy device that will reliably secure freight inside a trailer, so that the freight will not shift and sustain damage during transportation, or fall out and injure someone when the trailer doors are opened.

The present freight gate assembly is easy to install and use, economical, effective in securing freight and preventing damage and injuries, and is not easily damaged by loading and unloading equipment commonly used inside trailers or vans. The panels of the freight gate assembly protect the interior walls of the trailer. The freight gate assembly of the present invention can be installed in new or existing trailers. It is strong and adjustable for different sizes and types of freight. It is useful for partial or full loads, whether or not there are gaps between items or double stacked pallets in the load. The latching mechanism of the freight gate assembly minimizes the likelihood of human error because it is obvious to a loader when the gate arm has not been latched. The freight gate assembly is built into the trailer, so it cannot be lost or misplaced, and reusable, so there is no need to purchase new restraints for each trip. However, the freight gate arm can be placed in its storage position so that it is out of the way if it is not needed, or if the trailer is being loaded or cleaned.

BRIEF SUMMARY OF THE INVENTION

The present invention is a freight gate assembly for retaining freight in a trailer or van, which includes:

(a) a track system comprising at least two matching tracks, each of the tracks being affixable to opposite, longitudinal side walls of the trailer, each of the tracks comprising a longitudinally oriented channel and a plurality of spaced-apart, substantially same-sized notches, the notches being accessible from the channel; and (b) a freight gate restraining system comprising at least one adjustable gate rail, each gate rail having a first end comprising a latching mechanism for detachably latching the first end of the gate rail to a first one of the tracks by means of the notches in the first track, and an opposite, second end comprising a joint mechanism that is slidably movable along a second one of the tracks;

wherein the adjustable gate rail is substantially perpendicular to the tracks when it is in a closed position for restraining freight; and wherein each track is longer than the length of the gate rail and shorter than the length of the trailer.

Also included herein is an alternate embodiment of a freight gate assembly, which includes:

(a) a track system comprising at least two matching tracks, each being affixable to an opposite, longitudinal side wall of the trailer, each of the tracks comprising a channel along the longitudinal axis of the track and a plurality of spaced-apart, substantially same-sized notches; and (b) two corresponding gate arms, a first end of each of the gate arms comprising a joint mechanism that slidably fits into one of the track channels, a second end of each of the gate arms comprising a mechanism for detachably fastening the second ends of the two gate arms together for closing the freight gate assembly, each of the gate arm joint mechanisms comprising a protuberance that is movably insertable into each of the notches in the corresponding track;

wherein each track is longer than the width across an interior of the trailer or van, and shorter than the length of the interior of the trailer or van; and wherein the gate arms are substantially perpendicular to the tracks when the freight gate assembly is in a closed position for restraining freight; and wherein each gate arm is storable within the channel of its corresponding track.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
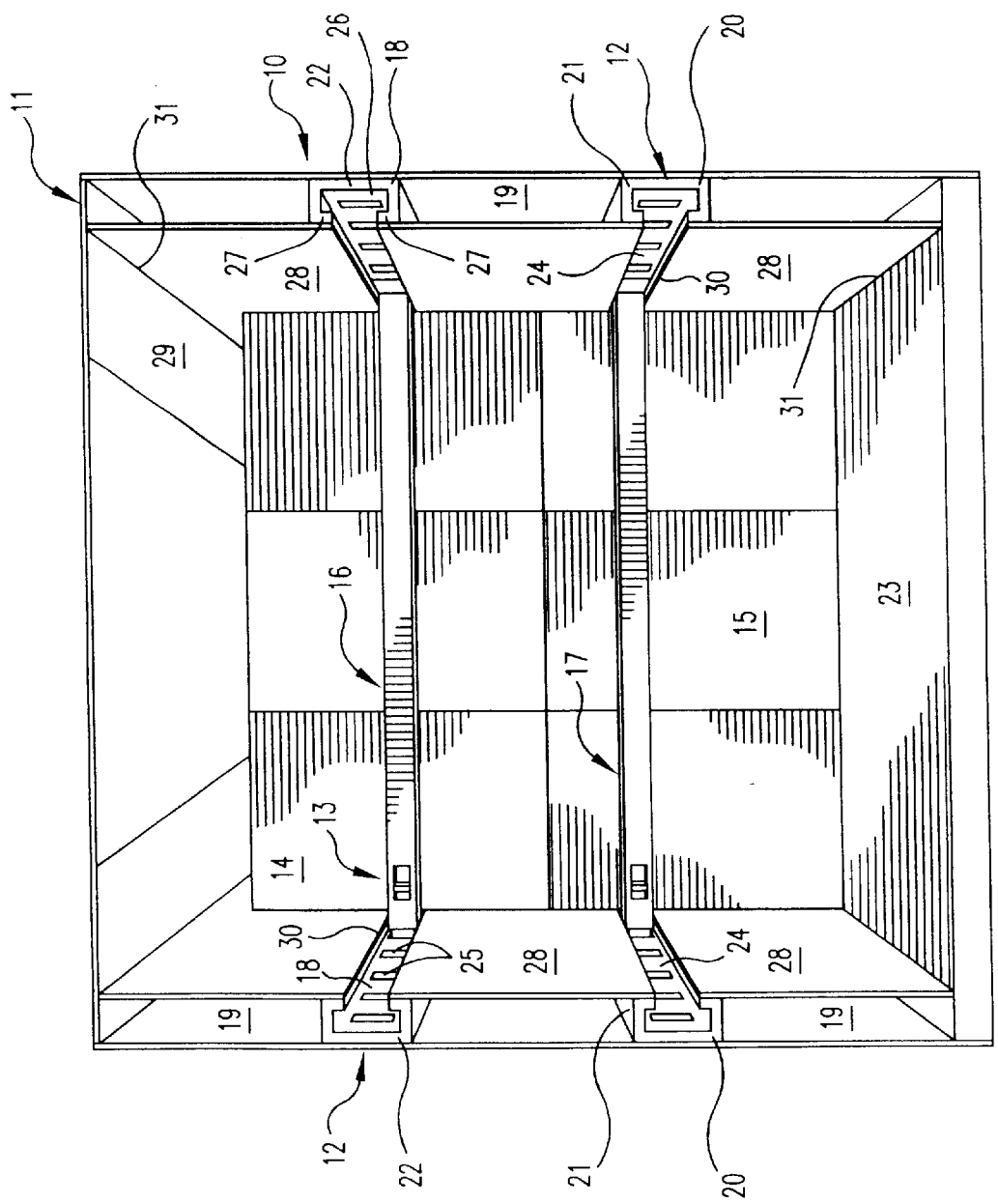
FIG. 1 shows a front perspective view of a freight gate assembly according to the present invention, shown in a trailer.

In the following description, like reference characters designate like or corresponding parts throughout the several views. Also, in the following description, it is to be understood that such terms as "front," "rear," "within," and the like are words of convenience and are not to be construed as limiting terms. Referring in more detail to the drawings, the invention will now be described.

Turning first to FIG. 1, an adjustable freight gate assembly according to the present invention, generally referred to as 10, is shown in use in the inside of a trailer 11 of a tractor trailer 11. The freight gate assembly 10 is for strapping freight into the tractor trailer or the like, so the freight is less likely to shift during transportation. The freight gate assembly 10 comprises a track system 12, which is shown installed along the two inside, opposite, longitudinal walls of the trailer 11. It can be used in any type of freight-hauling trailer, in a pick-up truck bed, a train car, a dry freight van, or in any type of wheeled vehicle used for hauling freight. The freight gate assembly 10 includes at least one freight gate retaining system 13, preferably two substantially identical freight gate retaining systems as shown in FIG. 1. Each freight gate retaining system 13 fits into a track system 12.

Each freight gate retaining system 13 operates independently of the other, which is particularly useful where the freight is uneven. For example, an upper level of freight 14 may project somewhat further forward than the lower level of freight 15 beneath it. In that case, the upper freight gate 16 can be adjusted at a setting closer to the door of the trailer 11, while the lower freight gate 17 is fixed at a setting that is farther away from the trailer door, and closer to the rear wall of the trailer 11 or van. For purposes of illustration, the trailer door is not shown in FIG. 1. The freight in FIG. 1 is shown in six large, same-sized boxes packed against the rear wall of the trailer 11 or van (nearest to the cab). The freight may be palletized or not, and may be virtually any items being hauled in the tractor trailer, van, etc. The freight gate assembly 10 can be installed in new or existing trailers.

Figure 2:
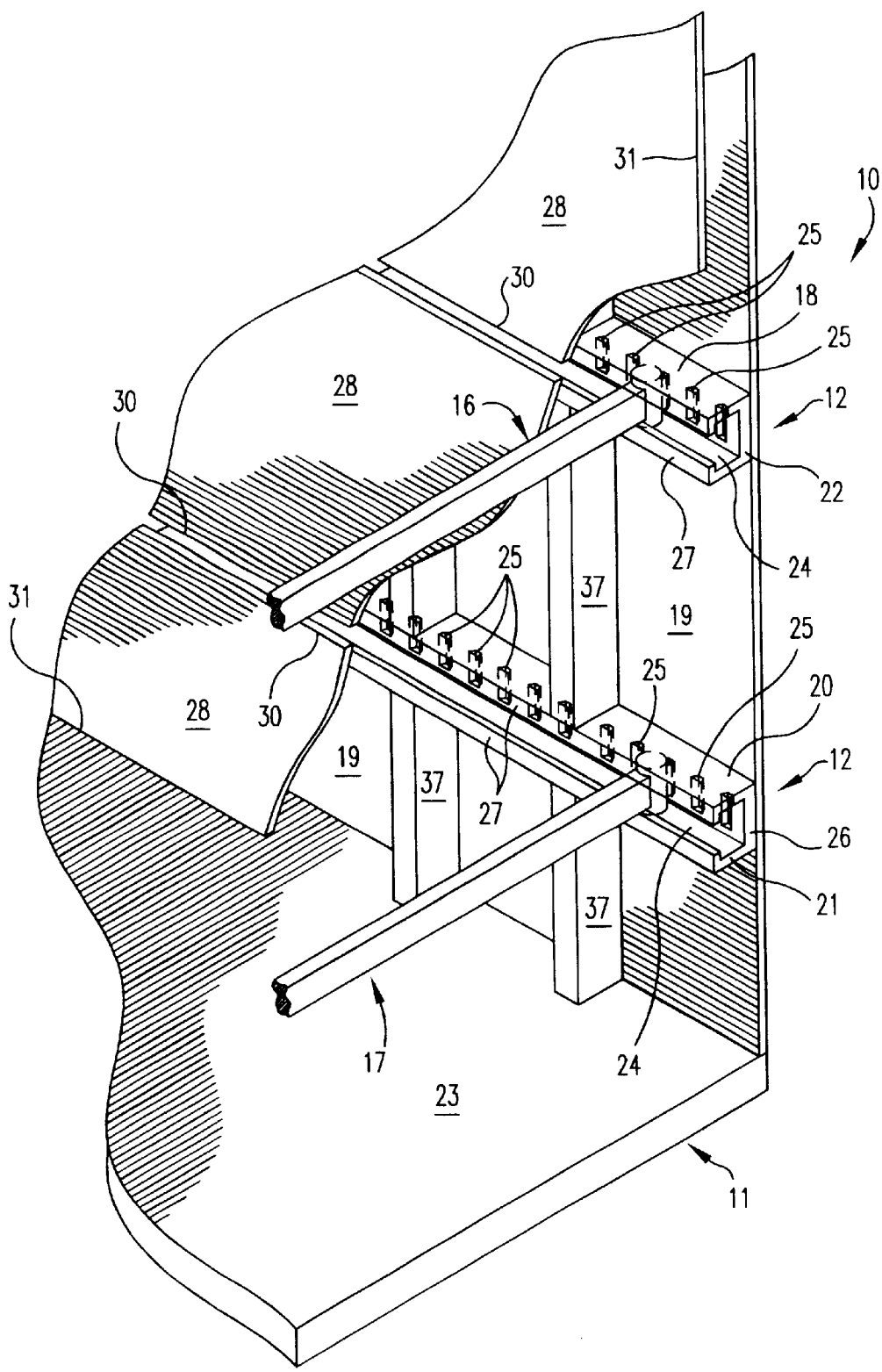
FIG. 2 is a perspective cutaway view of a portion of a freight gate assembly according to the present invention, shown in a trailer.

Referring to FIGS. 1 and 2, each track system 12 comprises a pair of tracks 18, which are substantially a mirror image of one another, and are installed opposite to one another. Each track 18 is affixed to a longitudinal side wall 19 of the trailer 11, with the front end 20 of the track 18 beginning a few inches inside the trailer door molding. Where two freight gate systems are utilized, two lower side tracks 21 of the track system 12 are affixed on opposite side walls 19 about a third of the distance up from the floor 23 of the trailer. Two upper side tracks 22 are affixed to the trailer's opposite longitudinal side walls 19 about a third of the distance up from the lower tracks 21 in the trailer, which is about ⅔ of the distance from the floor 23 level. The upper and lower side tracks 22, 21 are substantially parallel to the trailer floor 23 and to one another.

Figure 3:
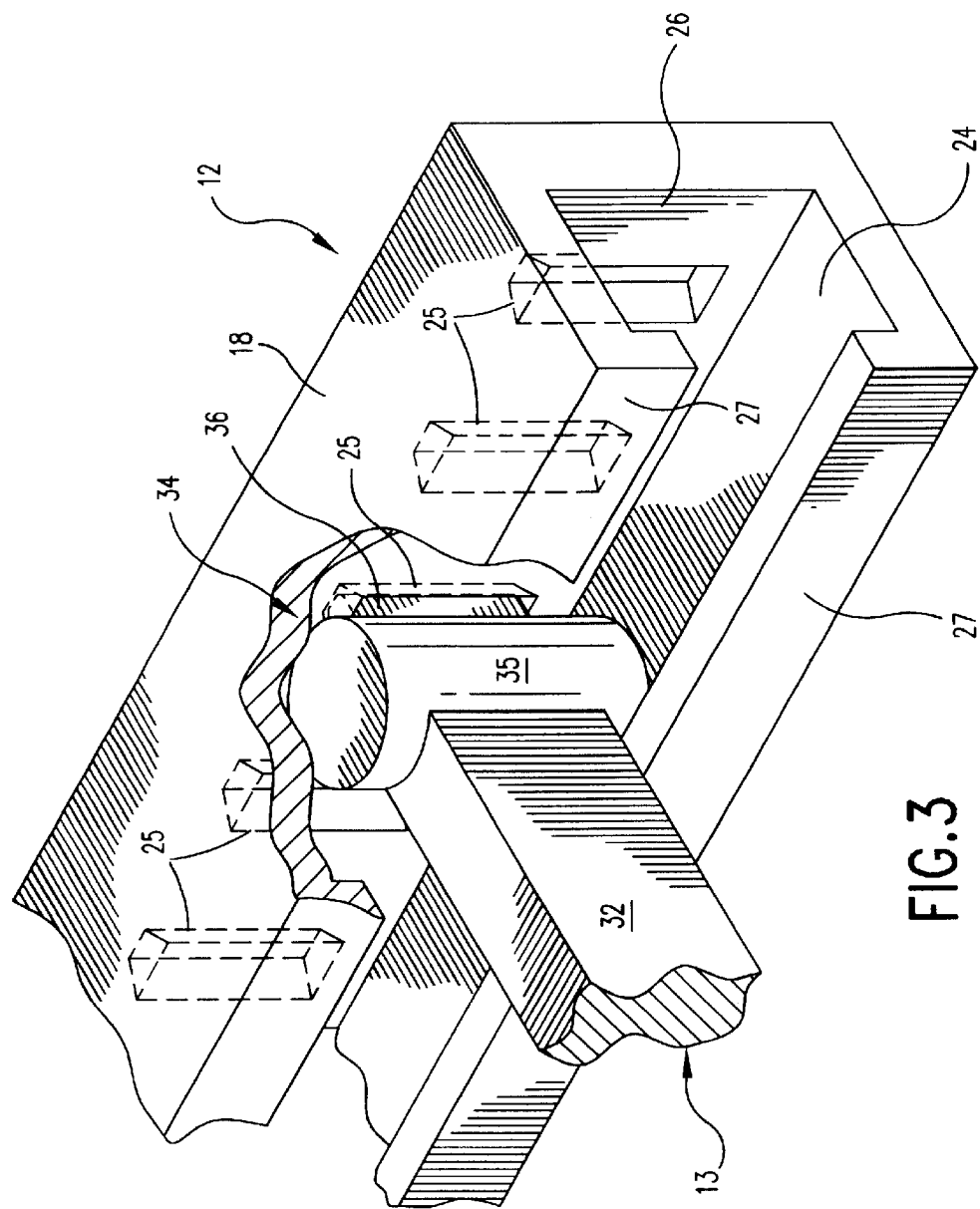
FIG. 3 is a perspective cutaway view of a portion of a freight gate assembly according to FIG. 2.

Referring to FIGS. 1 through 3, the tracks 18 are preferably generally in the shape of a squared off "C", and each forms a generally C-shaped central channel 24 facing the inside of the trailer 11. As shown in FIGS. 1–3, each C-shaped track 18 comprises a plurality of transverse, same-sized, central notches 25, which are parallel to one another and accessible from the channel 24. As shown in FIG. 3, the notches 25, which are preferably rectangular in shape, are formed along the backbone 26 of the C-shape, while the two opposite arms 27 of the C-shape support panels 28. A longitudinal edge 30 of each panel 28 is affixed to the outside of one of the arms 27 of one of the C-shaped tracks 18. An opposite longitudinal edge 31 of the lowermost and uppermost panels 28 abuts the trailer floor 23 or ceiling 29, respectively.

The panels 28 form false opposite side walls, resembling paneling, over the opposite longitudinal trailer side walls 19, from the trailer floor 23 to the trailer ceiling 29. Since the tracks 18 are only a few inches thick, the panels 28 are only a few inches from the trailer side walls 19 behind them. The panels 28 are preferably generally rectangular in shape, and three panels 28 preferably make up each longitudinal false side wall. The channels are open and accessible from the interior of the trailer. The upper and lower edges of a central one of the panels 28 on each side of the trailer are affixed to the outside of the upper and lower arms 27 of the lower and upper side tracks 21, 22, respectively. The panels 28 generally prevent the freight from scooting under or over the tracks 18, which can damage the track system 12 and possibly the freight.

Figure 4:
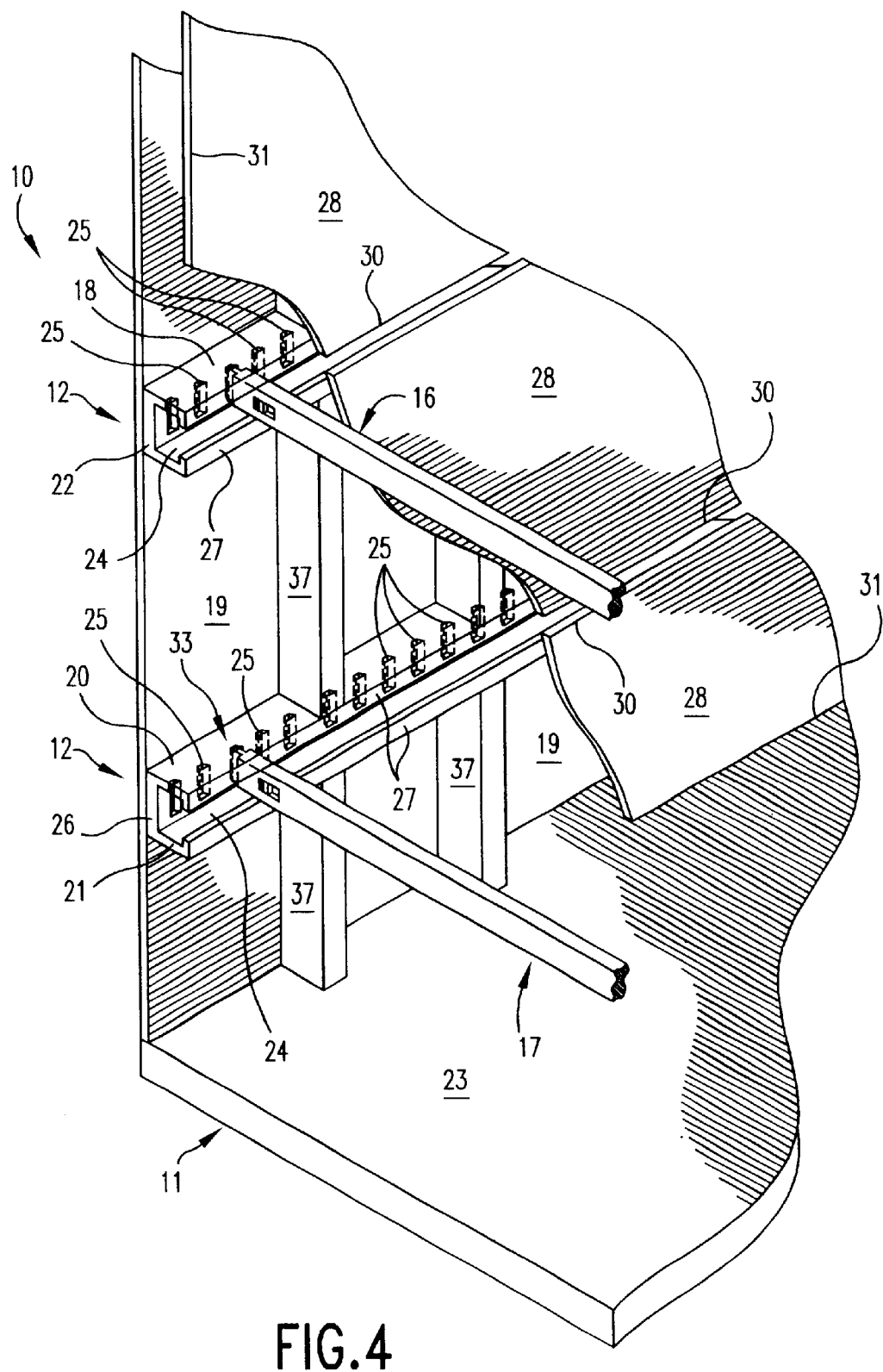
FIG. 4 is a perspective cutaway view of a portion of a freight gate assembly according to the present invention, shown in a trailer.
Figure 5:
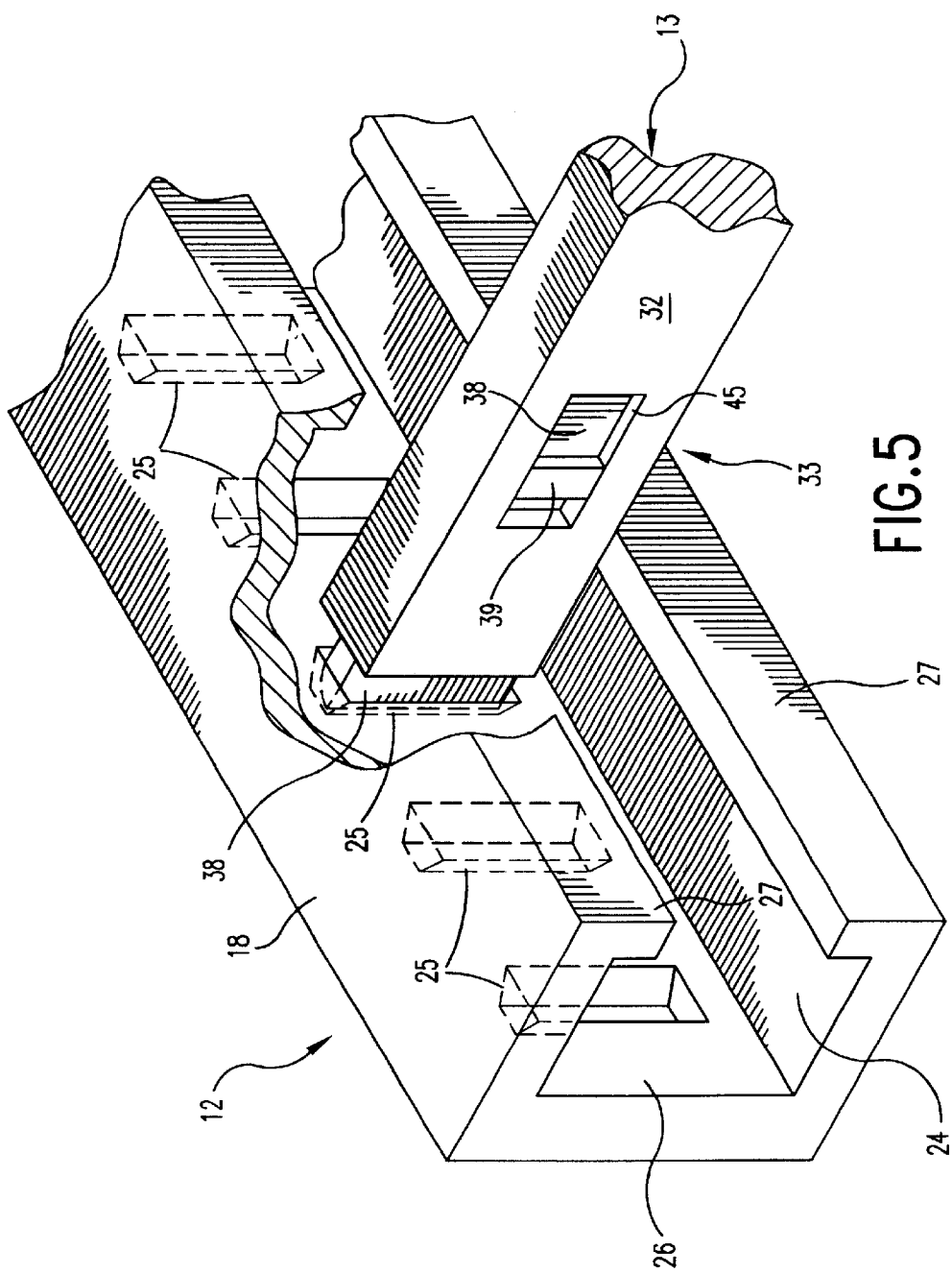
FIG. 5 is a perspective cutaway view of a portion of a freight gate assembly according to FIG. 4.

With attention to FIGS. 3 through 5, the preferred embodiment of the freight gate retaining system 13 described herein is comprised of upper and lower freight gates 16, 17. Each freight gate 16, 17 is comprised of a gate rail 32 having a latching mechanism 33 at one end and a movable joint mechanism 34 at an opposite end. The gate rail 32 is preferably made of steel.

Each side track 18 is longer than the gate rail 32 or the width of the interior of the trailer 11, but shorter than the (interior) length of the trailer 11. Preferably, the length of the gate rail 32 is substantially equal to the inside width of the trailer 11 from one longitudinal false wall to the opposite longitudinal false wall (see FIG. 1). The tracks 18 preferably extend approximately ⅔ to ¾ of the length of the trailer, beginning just inside the trailer door. Freight is normally packed against the rear wall of the trailer, and tractor trailer owners endeavor to maximize profits by moving full loads. Since it is rare for a trailer to move when it is less than half full, the tracks 18 need not extend the full length of the trailer. This conserves track materials and reduces manufacturing costs for the present freight gate assembly.

The freight gate assembly 10 can be built into, for example, a 53-foot trailer, which can then be hauled by an 18 wheeler. A preferred embodiment herein for a 53 foot trailer 11 includes tracks 18 that are approximately 12 feet in length, and a gate rail that is approximately 8 feet in length.

FIG. 3 shows the joint mechanism 34, which is comprised of a cylindrical joint 35, which connects to the gate rail 32 on one side of the cylinder. A protuberance 36 extends from an opposite side of the cylindrical joint. The cylindrical joint 35 fits closely into the C-shaped channel 24, with the flat top and bottom of the cylindrical joint 35 being slidable along the top and bottom of the channel, respectively. The protuberance 36 fits closely into the same-sized notches 25 along the backbone 26 of the C-shaped channel 24. In this embodiment, each generally rectangular-shaped notch 25 is rounded at the bottom to accommodate the similarly rounded edge of the protuberance 36. The edge of the protuberance 36 is formed in generally the same shape as one of the notches 24.

As shown in FIGS. 2 and 4, plywood studs 37 preferably support the panels 28 against the trailer side walls 19. The studs 37 are preferably approximately the same thickness as the tracks 18, and are most preferably ½ inch or ¾ inch metal or plywood uprights. The studs 37 are generally perpendicular to the lower and upper tracks 21, 22. Studs 37 are wedged between the lower track 21 and the trailer floor 23, the lower and upper tracks 21, 22, and the upper track 22 and the trailer ceiling 29.

To use the freight gate assembly 10, the user packs the freight against the rear wall of the trailer 11, pulls the gate rail 32 of the lower or upper freight gate system 13 out of the track channel 24, slides the cylindrical joint 35 on the end of the gate rail 32 back along the track 18 until the cylindrical joint protuberance snaps into a notch 25 just in front of the freight, then the user latches the latching mechanism 33 on the opposite end of the gate rail 32 into a corresponding notch 25 in the corresponding track 18 on the opposite wall. To adjust the freight gate rail to a different setting, the user grasps the gate rail 32 and pulls it toward himself or herself until the joint protuberance 36 pops out of the notch 25 it is in. The user then slides the gate rail 32 and its cylindrical joint 35 toward himself or herself along the track channel 24 until he or she hears or feels the protuberance 36 pop into the next notch 25 in line. Once a desired setting is reached, the user latches the opposite end of the gate rail 32 using the latching mechanism 33, and proceeds to the other freight gate system.

The end of the gate rail 32 is rotatable approximately 180 degrees on its cylindrical joint 35. In fact, when the gate rail 32 is unlocked and not in use, it can be stored within the channel 24. This is advantageous in that freight can be loaded without interference from the freight gate assembly 10. Also, the gate rail 32 can be stored in the joint mechanism track 18 in the event that the freight gate system is not going to be used; for example, where the trailer is being loaded, emptied or cleaned, or where the trailer is loaded to the brim.

As shown in FIGS. 4 and 5, the latching mechanism 33 is in the end portion of the gate rail 32. The latching mechanism 33 preferably comprises a spring-loaded, retractable tongue 38 in an end portion of the gate rail 32, and a button 39 or the like extending from the side or sides of the tongue 38. The button 39, which is accessible from the side of the end portion of the gate rail, controls movement of the tongue 38.

In this preferred embodiment, the user pulls the button 39 in a backward direction, usually with his or her thumb, which pulls the spring-loaded tongue 38 out of the notch 25 it is in and back into the end of the gate rail 32. The user then pulls the latching mechanism end of the gate rail 32 away from its track 18 in order to open the gate and access the freight.

Figure 6A:
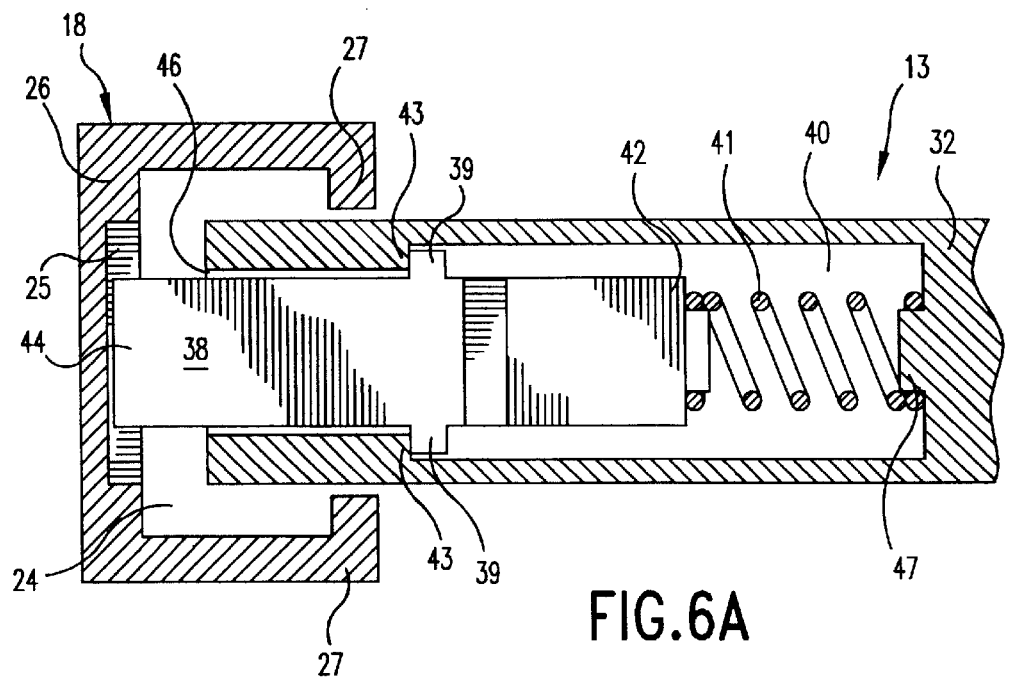
FIGS. 6A and 6B are cross-sectional views of a latching mechanism of a freight gate assembly according to the present invention, shown in closed (6A) and open (6B) positions.
Figure 6B:
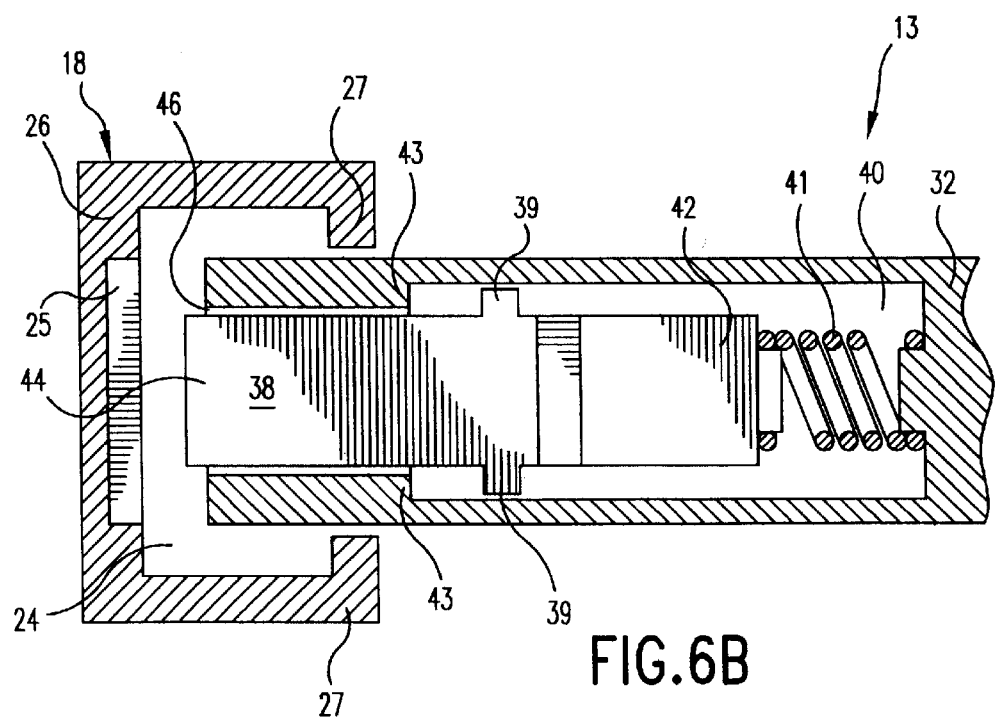

Referring to the cross-sections shown in FIGS. 6A and 6B, the latching mechanism 33 is shown, as viewed from above, in a closed position in FIG. 6A, and an open position in FIG. 6B. The C-shaped track 18 with its central channel 24, notched backbone 26, and arms 27 is shown on the left side of FIGS. 6A and 6B. Ordinarily, the latching mechanism 33 is in the position shown in FIG. 6A, with a tension spring 41 pushing against a posterior end 42 of the tongue 38. Matching buttons 39, or projections, on opposite sides of the tongue 38 rest against matching interior shoulders 43 in the interior opposite side walls of the end portion of the gate rail 32. A slot 45 in the exterior wall of the gate rail permits a user access to the button 39 (see FIG. 5).

As shown in FIGS. 6A and 6B, the tongue 38 rests within a generally rectangular-shaped hollow 40 in the end portion of the gate rail 32, with the anterior end 44 of the tongue 38 projecting from an aperture 46 in the end of the gate rail. The anterior end 44 of the tongue 38 is shown extending into the track channel 24 in FIG. 6A. An opposite end of the spring 41 is depressed against a posterior wall 47 of the hollow 40.

When the user pulls back the button(s) 39, and therefore the tongue 38, he or she is exerting pressure against the spring 41 and retracting the anterior end 44 of the tongue from the notch 25. Therefore, when the user releases the button 39, and therefore the tongue 38, the tongue springs back to its extended (closed) position, whether or not the anterior end of the tongue is in the notch 25 (unless something is pressing on the anterior end of the tongue from outside the gate rail).

When the latching mechanism 33 is in the closed position, which normally means that it is latched, the retractable tongue 38 extends into the chosen notch 25 in the track 18, as shown in FIG. 6A. When the latching mechanism is in the closed position, the freight behind the gate rail 32 is prevented from moving, even when the freight behind the gate rail is jostled during movement of the truck, or tractor trailer. In that case, the gate rail 32 cannot be moved unless it is unlatched. When the latching mechanism 33 is in the open position, which means that it is unlatched, the tongue 38 is retracted into the end of the gate rail 32, as shown in FIG. 6B. The width of the gate rail 32 is substantially the same as the width of the distance between the edges of the upper and lower arms 27 of the C-shaped tracks 18.

Figure 7:
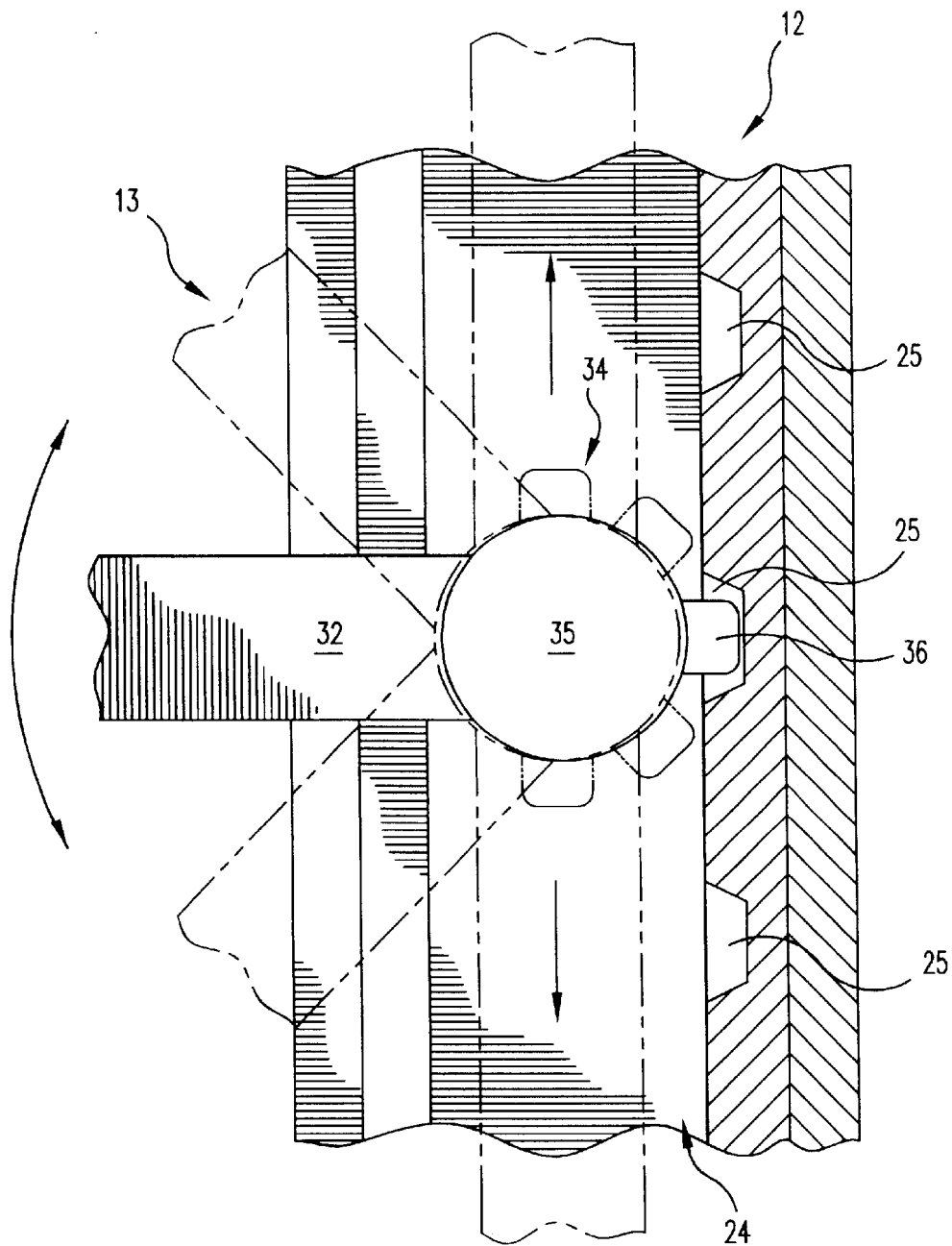
FIG. 7 is a cross-sectional view of a joint mechanism of a freight gate assembly according to the present invention, showing several alternate gate positions in phantom line.

Referring to FIGS. 6B and 7, when the gate rail 32 is in an open position, the opposite end of the gate rail can be swiveled on its cylindrical joint 35, and the gate rail can be swung open to a position that is 90 degrees from its former perpendicular position, and into the channel 24 of the opposite track 18, as shown in FIG. 7. The gate rail 32 can be stored within the channel 24 of the joint mechanism track 18. In the FIG. 7 cross-section, the joint mechanism 34 is shown along with several alternate gate rail positions. The gate rail 32 is swivelable approximately 180 degrees on its cylindrical joint 35, as indicated in phantom line in FIG. 7. The cylindrical joint 35 can also be pushed or pulled in a forward or backward direction, as indicated by the arrows in FIG. 7, along the track channel 24. When the cylindrical joint 35 is swiveled, the protuberance 36 moves with it, as is also shown in phantom line in FIG. 7.

Thus, the freight gate retaining system 13 comprises the gate rail 32 movably attachable at each of its ends to the opposite tracks 18 on the opposite side walls 19 of the trailer. Each gate rail end movably fits into an opposite one of the tracks 18. The gate rail 32 is substantially perpendicular to the tracks 18 when it is in a closed position for retaining freight, and substantially parallel to the tracks 18 when it is in an open position for receiving freight.

Also, the first end of the gate rail 32 holds the latching mechanism 33 for latching the end of a first gate rail 32 to a first one of the tracks 18. The latching mechanism 33 preferably includes the retractable tongue 38, which closely fits into the notches 25 of the first track (which is on the left side in FIG. 1), and a spring 41 having one of its ends resting against a posterior end 42 of the tongue 38. The tongue 38 preferably has opposite matching buttons 39 projecting from its opposite sides, with at least one of the buttons 39 accessible from a face (an exterior side) of the gate rail 32 (in slot 45). The tongue 38 preferably rests within a generally rectangular-shaped hollow 40 in the end portion of the gate rail 32, with the anterior end 44 of the tongue 38 projecting from an aperture 46 in the end of the gate rail. An opposite end of the spring 41 is preferably depressible against a posterior wall 47 of the hollow 40.

Furthermore, the opposite, second end of the gate rail 32 has the joint mechanism 34, which is retractably insertable into at least one (and preferably all) of the notches 25 in a second one of the tracks 18. In a preferred embodiment, the joint mechanism 34 comprises: (a) a cylindrical joint 35 attached along one side to a second end of the gate rail 32; and (b) a protuberance 36 projecting from an opposite side of the cylindrical joint 35, the protuberance 36 being removably insertable into at least one (and preferably all) of the notches 25 of the second track. An edge of the joint protuberance 36 is preferably rounded to substantially correspond to the shape of the bottom of a notch 25. The cylindrical joint 35 preferably has a generally flat top and bottom, and is slidable along the C-shaped channel 24.

In the preferred embodiment shown in the figures:
a. Each of the tracks 18 is generally C-shaped, and forms a generally C-shaped central channel 24, the cylindrical joint 35 fitting closely into the C-shaped channel 24 of the second track.
b. The C-shaped track 18 includes a substantially flat backbone 26 comprising the spaced apart, matching notches 25, and two arms 27 projecting out from the top and bottom of the backbone 26.
c. When the freight gate assembly 10 is installed in a trailer, the track arms 27 support the upper and lower edges 30, 31 of a plurality of panels 28; the panels 28 being substantially parallel to the longitudinal opposite side walls 19 of the trailer 11. When assembled, the paneled walls extend from the trailer floor 23 to the ceiling 29, on opposite sides of the trailer.
d. The notches 25 are parallel to one another, substantially rectangular in shape, and accessible from the channel 24.
e. The width of the gate rail 32 is substantially the same as the width of the distance between the edges of the upper and lower arms 27 of the C-shaped tracks 18, so the gate rail 32 fits into the second track (which is shown on the right side of FIG. 1) when the freight gate retaining system 13 is in an open, storable position.
f. When the latching mechanism 33 is in a closed position, the retractable tongue 38 extends into one of the notches 25 in the first track. When the latching mechanism 33 is in an open, unlatched position, the tongue 38 is retracted into the end of the gate rail 32.

Figure 8:
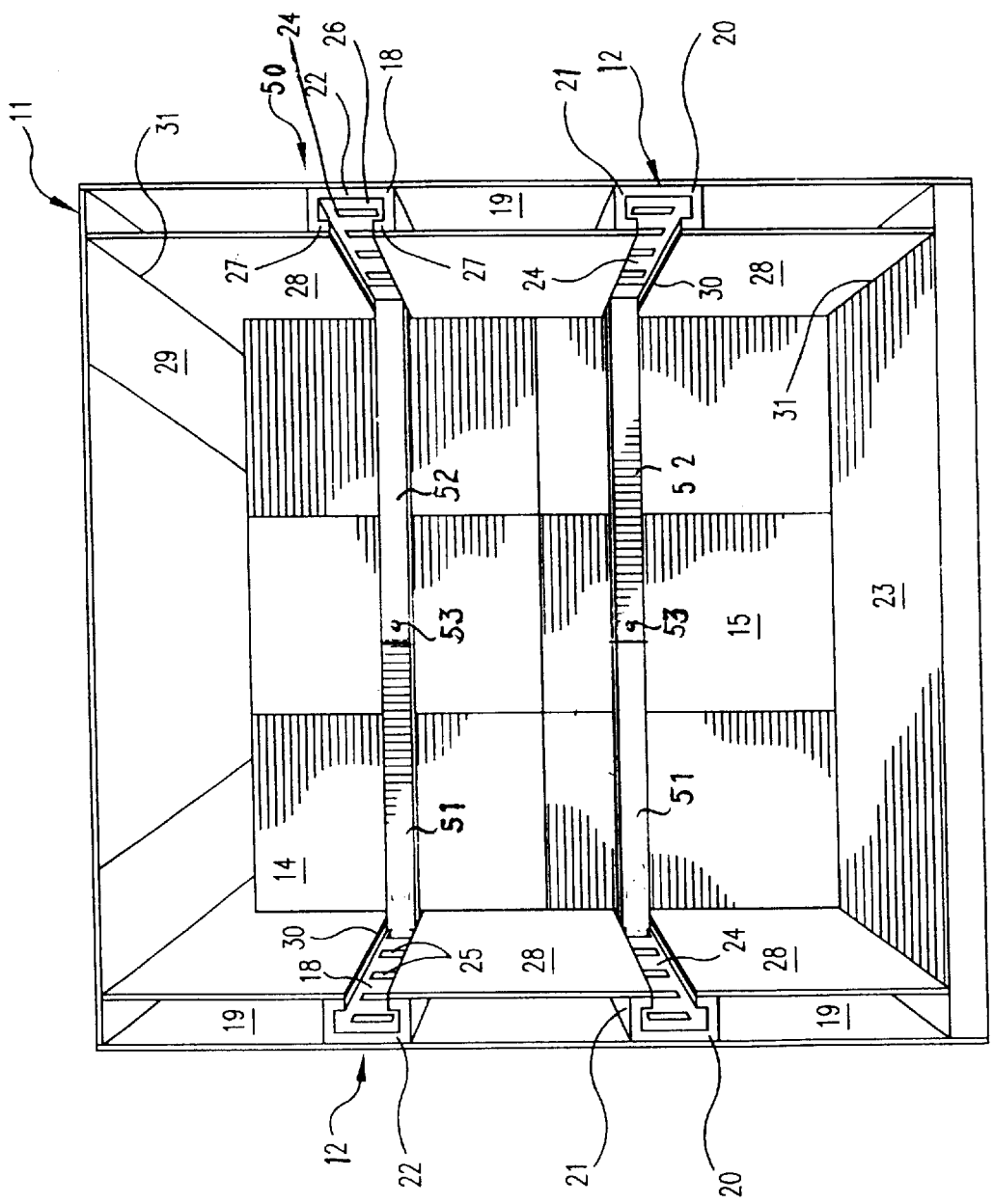
FIG. 8 shows a front perspective view of an alternate, double gate arm embodiment of a freight gate assembly according to the present invention, shown in a trailer.

An alternate embodiment 50 of the freight gate assembly, which is shown in FIG. 8, features double, center-closing gate arms. This embodiment 50 for restraining freight in a trailer or van, includes:
(a) a track system 12 comprising at least two matching tracks 18, each being affixable to an opposite, longitudinal side wall 19 of the trailer 11, each of the tracks 18 comprising a channel 24 along the longitudinal axis of the track 18 and a plurality of spaced-apart, substantially same-sized notches 25; and
(b) two corresponding gate arms 51, 52. A first end of each of the gate arms 51, 52 includes a joint mechanism 34 that slidably fits into one of the track channels 24. A second end of each of the gate arms includes a mechanism for detachably fastening the second ends of the two gate arms together for closing the freight gate assembly 50. Each of the gate arm joint mechanisms 34 has a protuberance 36 that is removably insertable into each of the notches 25 in the corresponding track 18. Each track 18 is longer than the width across an interior of the trailer 11 or van, and shorter than the length of the interior of the trailer 11 or van. The gate arms 51, 52 are substantially perpendicular to the tracks 18 when the freight gate assembly 50 is in a closed position for restraining freight. Each gate arm 51, 52 is storable within the channel 24 of the corresponding track 18.

Figure 9:
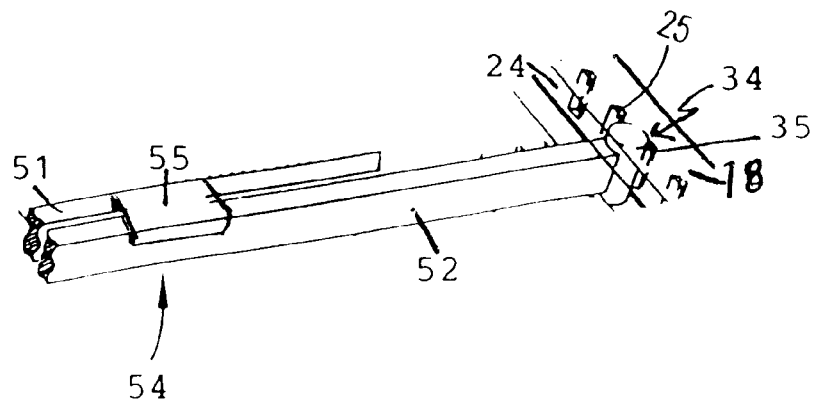
FIG. 9 is a perspective cutaway view of a portion of an alternate, double gate arm embodiment of a freight gate assembly according to the present invention.
Figure 10:
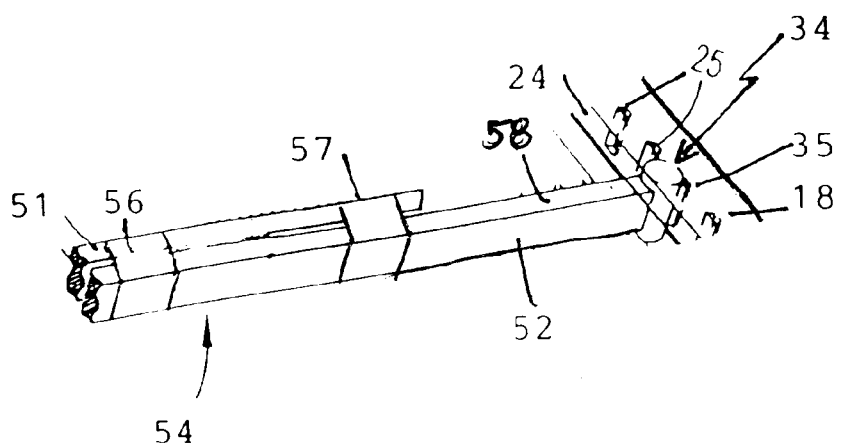
FIG. 10 is a perspective cutaway view of a portion of an alternate, double gate arm embodiment of a freight gate assembly according to the present invention, showing double brackets.

Continuing to refer to FIG. 8, this embodiment 50 includes a system of panels 28 backed by studs 37 as shown in FIGS. 1 and 2 and described hereinabove. There may be one set of double freight gate system (double gate arms 51, 52, tracks 18, panels), or an upper and a lower set of double freight gates in a trailer. Each set operates independently of the other, which is particularly useful where the freight is unevenly packed in the trailer or van. FIGS. 8 through 10 each depict an alternate mechanism for fastening the double gate arms 51, 52 together.

As shown in FIG. 8, a right double gate arm 51 slightly overlaps a left double gate arm 52 at the approximate center of the trailer. Again, upper and lower double freight gates 16, 17, respectively, fasten in front of the load to restrain the load in the trailer. Here, though, both gate arms 51, 52 end in cylindrical joints 35, the left gate arm 51 in the left side track and the right gate arm 52 in the right side track 18. Preferably, in a 53 foot long trailer, for example, the gate arms 51, 52 overlap each other about 12 to 18 inches, and each of the gate arms 51, 52 is approximately 4 ½ to 5 feet in length. The gate arms 51, 52 (or gate rails 32) may be made of metal, or any material that can withstand the weight of the freight sliding against it. Also, the gate arms 51, 52 (or gate rails 32) may be wide or narrow (see FIG. 8), and solid (see FIG. 8) or cut out (e.g., resembling a car grill).

Continuing with FIG. 8, the end portions of the double gate arms 51, 52 are detachably affixed to one another by a pin fastener. The pin fastener comprises a removable locking pin 53 that extends through matching apertures in the end of each double gate arm 51, 52. The end of the pin 53 is preferably fastened, by a short chain (not shown) attached to the end of the pin, to one of the double gate arms. Several pins and corresponding sets of apertures may be employed along an overlapping portion 54 of the gate arms. The overlap strengthens the gate. Prior to insertion of the pin 53, each gate arm is pushed toward its corresponding trailer wall to fix its joint protuberance 36 in the selected track notch 25. Each gate arm swings in either direction (i.e., toward or away from the rear trailer wall). A screw fastener would also be suitable; it would have the same appearance as the pin 53 in FIG. 8.

After loading the freight, the user slides the gate arms 51, 52 back along their respective tracks until the protuberances 36 of the cylindrical joints 35 of the gate arms 51, 52 pop into the appropriate notches 25 in the opposite tracks 18 in front of the load. The user then pushes the free end of the left gate arm 51 toward the center of the trailer, then the pushes the free end of the right gate arm 52 to meet the left one (or vice versa). The user then inserts the pin 53 through the aligned apertures in the end portions of the left and right gate arms 51, 52 (see FIG. 8). To open the freight gate for unloading at the destination, the unloader (person who is unloading the freight) removes the pin 53 from the apertures and pulls the free ends of the gate arms 51, 52 toward himself. The unloader then pushes each gate arm into the channel 24 of its respective track 18 for storage and safety, and proceeds to unload the freight.

Referring to FIG. 9, a single bracket 55, or clasp, fastens down over the top of the overlapping portion 54 of two adjacent double gate arms 51, 52 when the assembly is in a closed position. A portion of the upper or lower freight gate is shown in FIG. 9 for purposes of illustration. The rear edge of the single bracket 55 is hinged to the rear (faces the rear trailer wall) of the rearmost (left, here) double gate arm 51 by a hinge (not shown), so that the single bracket 55 is easily accessible and is not lost when it is not in use. The width of the bracket 55 is approximately equal to the thickness of the two gate arms 51, 52.

To use the single bracket 55 of FIG. 9 after loading the freight in the trailer, the user pushes the left double gate arm 51 toward the center of the trailer, then the right double gate arm 52 to meet the left one, then the user pushes the bracket 55 down over the top of the left and right gate arms. To open the freight gate for unloading, the user simply pulls the free end of the bracket 55 up and pulls the gate arms 51, 52 toward himself or herself. The user can then push each double gate arm 51, 52 into its respective track channel to keep it out of the way during unloading.

As shown in FIG. 10, double sliding brackets 56, 57 each of which slides over the free end of the opposite double gate arm 51, 52, can alternatively be employed. A portion of the upper or lower freight gate is shown in FIG. 10 for purposes of illustration. The double sliding brackets 56, 57 are of approximately the same width as, and accommodate, two gate arms.

To use the double brackets 56, 57 of FIG. 10 after loading the freight, the user pushes the left double gate arm 51 toward the center, then the right double gate arm 52 to meet the left one, then the user slides the left double bracket 56 over the end of the right double gate arm 52, and the right double bracket 57 over the end of the left double gate arm 51 (or vice versa). When not in use, each double sliding bracket 56, 57 hangs in depressions 58 (shown for the right double bracket 57) on top of its respective double gate arm, so that they are easily accessible and will not be lost when they are not in use. To open the freight gate for unloading, the user simply pushes the left double bracket 56 toward the left trailer wall, and the right double bracket 57 toward the right trailer wall (or vice versa), and pulls the double gate arms toward himself or herself. The user can then push each double gate arm 51, 52 into its respective track channel to keep it out of the way during unloading.

Figure 11:
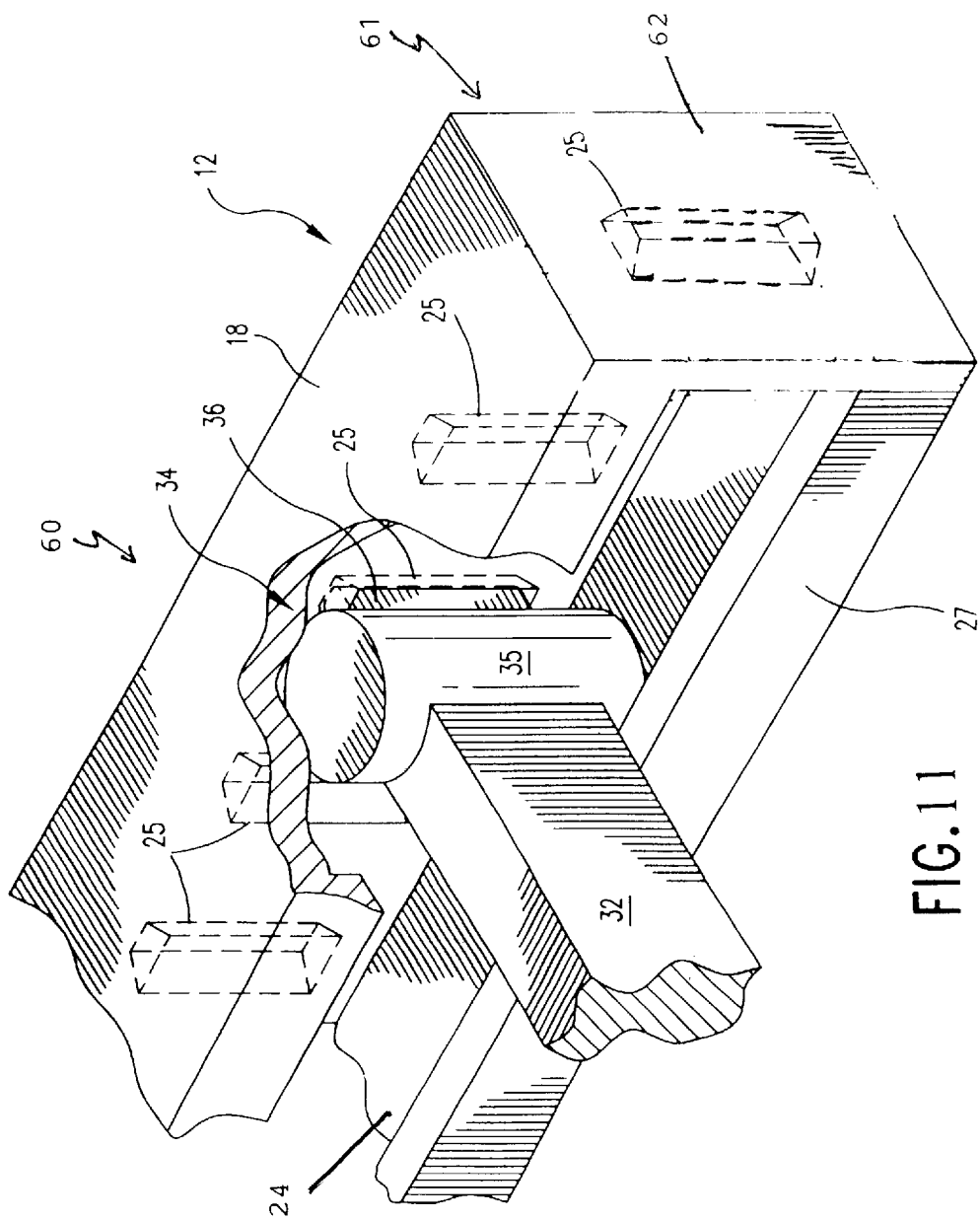
FIG. 11 is a perspective cutaway view of a portion of a freight gate assembly according to the present invention, showing a front end track wall.

Turning to FIG. 11, a preferred embodiment 60 of the freight gate assembly further comprises a mechanism 61 for automatically locking the first end of the upper or lower gate rail 16, 17 in the second tracks 18, in a single gate rail embodiment herein, or for locking the gate arms 51, 52 in their respective tracks 18 on opposite sides of the trailer 11 in a double gate arm embodiment. Since it is easy for freight company employees and tractor trailer drivers to forget to secure the gate rail 32 or gate arm 51, 52 in the track 18, this important safety feature minimizes human error. With this locking mechanism 61 in the front, door end of the track 18, the gate rails, or gate arms, do not flop back and forth while the tractor trailer or freight van is in motion, which would cause damage to its interior. Also, the unloaders, or people cleaning the trailer or van, are unlikely to be injured by a loose gate rail or arm.

Continuing with FIG. 11, the locking mechanism 61 also employs the latching mechanism 33, including the latching tongue 38 and button 39 on the end of the gate rail, as shown in FIG. 5. The gate rail locking mechanism 61 comprises a front end wall 62 at a front end of the second track 18. The front end track wall 62 has a central notch 25 facing the track channel 24 for receiving the latching mechanism tongue 38 when the gate rail 32 is in an open, storable position (also see FIG. 7). For purposes of illustration, the front end wall notch 25 is shown in dashed line in FIG. 11. The front end track wall 62 blocks off the front, door end of the track 18, so the gate rail 32 or gate arm 51, 52 cannot slide out when the trailer door is open, and is at a right angle to the channel backbone 26. For the single gate embodiment, only the second, gate rail receiving upper/lower tracks need include the locking mechanism 61.

As soon as the user pushes the gate rail 32 into the track channel 24, the locking mechanism 61 detachably locks the gate rail into the channel 24, where it stays out of the way until it is needed. The front end wall notch 25 receives the depressible tongue 38 of the latching mechanism 33. The gate rail/arm stays secure in the receiving track 18. To unlock the gate rail or gate arm from this open, storage position, the user moves the button 39 on the rear face of the end portion of the gate rail 16, 17. The front face of the gate rail also includes the mirror image button 39 for unlatching the gate rail when it is in a closed, latched position. Pulling back on the button 39 retracts the tongue 38 into the end of the gate rail, so the gate rail can be pulled out of the track 18 for use. Other suitable locking mechanisms may alternatively be employed.

The double gate arm embodiment of the present invention also further comprises a gate arm locking mechanism 61 on the front, trailer door end of each track 18 for restraining each of the gate arms 51, 52 in its respective track channel 24 when the freight gate assembly is in an open, storable position. The free ends of each gate arm 51, 52 preferably also include a latching mechanism 33, with the front door ends of the opposite tracks 18 having a front, door end wall 62 with a notch 25, as shown in FIG. 11. When the gate arm 51, 52 is pushed into the channel 24, the tongue 38 of each latching mechanism fits into the front end track wall notch 25. Other suitable locking mechanisms may alternatively be employed. The gate arms may alternatively be locked in an open position for storage when the trailer is empty.

In all of the embodiments herein, it is preferred that the ends of the tracks 18, including the rear ends closest to the rear wall of the trailer, be blocked off, as by a rear wall at the end of the channel 24. This prevents the gate rails 32, or gate arms 51, 52, from sliding out of the tracks 18.

From the foregoing it can be realized that the described device of the present invention may be easily and conveniently utilized as a gate assembly for restraining freight in a trailer or the like. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED IN THE DRAWINGS 10 freight gate assembly
11 trailer 12 track system
13 freight gate system
14 upper level of freight
15 lower level of freight
16 upper freight gate
17 lower freight gate
18 track
19 trailer side wall
20 front end of track
21 lower side track
22 upper side track
23 trailer floor
24 channel
25 notches
26 backbone of C-shape
27 arm of C-shape
28 panel
29 trailer ceiling
30 edge of panel
31 opposite edge of panel
32 gate rail
33 latching mechanism
34 joint mechanism
35 cylindrical joint
36 joint protuberance
37 stud
38 tongue of latching mechanism
39 button of latching mechanism
40 hollow in gate rail
41 spring
42 posterior end of tongue
43 interior shoulder of gate rail
44 anterior end of tongue
45 slot for button
46 aperture in gate rail end
47 posterior wall of hollow
50 second embodiment-freight gate assembly
51 left double gate arm
52 right double gate arm
53 pin
54 overlapping portion of gate arms
55 single bracket
56 left double sliding bracket
57 right double sliding bracket
58 depressions
60 alternate embodiment-freight gate assembly
61 gate rail locking mechanism
62 front, door end wall of track

What is claimed is:

1. A freight gate assembly for retaining freight in a trailer or van, the assembly comprising:
   (a) a track system comprising at least two matching tracks, each of the tracks being affixable to opposite, longitudinal side walls of the trailer, each of the tracks comprising a longitudinally oriented channel and a plurality of spaced-apart, substantially same-sized notches, the notches being accessible from the channel; and
   (b) a freight gate restraining system comprising at least one adjustable gate rail, each gate rail having a first end comprising a latching mechanism for detachably latching the first end of the gate rail to a first one of the tracks by means of the notches in the first track, and an opposite, second end comprising a joint mechanism that is slidably movable along a second one of the tracks;
   wherein the adjustable gate rail is substantially perpendicular to the tracks when it is in a closed position for restraining freight;
   wherein each track is longer than the length of the gate rail and shorter than the length of the trailer; and
   wherein, when the freight gate assembly is installed in a trailer, track arms support the edges of a plurality of panels; the panels being substantially parallel to the longitudinal opposite side walls of the trailer and, when assembled, extending from a floor of the trailer to a ceiling of the trailer on opposite sides of the trailer.

2. A freight gate assembly according to claim 1, wherein the latching mechanism comprises a retractable tongue that is insertable in at least one of the notches of the first track.

3. A freight gate assembly for retaining freight in a trailer or van, the assembly comprising:
   (a) a track system comprising at least two matching tracks, each of the tracks being affixable to opposite, longitudinal side walls of the trailer, each of the tracks comprising a longitudinally oriented channel and a plurality of spaced-apart, substantially same-sized notches, the notches being accessible from the channel; and
   (b) a freight gate restraining system comprising at least one adjustable gate rail, each gate rail having a first end comprising a latching mechanism for detachably latching the first end of the gate rail to a first one of the tracks by means of the notches in the first track, and an opposite, second end comprising a joint mechanism that is slidably movable along a second one of the tracks by means of the notches in the second track;
   wherein the adjustable gate rail is substantially perpendicular to the tracks when it is in a closed position for restraining freight: and each track is longer than the length of the gate rail and shorter than the length of the trailer; and
   wherein the latching mechanism comprises a retractable tongue that is insertable in at least one of the notches of the first track, and a spring having one of its ends resting against a posterior end of the retractable tongue, the tongue comprising opposite matching buttons projecting from opposite sides of the tongue, at least one of the buttons being accessible from a face of the gate rail.

4. A freight gate assembly according to claim 3, wherein the gate rail is substantially parallel to the tracks, and the gate rail fits into and is storable in the channel of the second track, when the freight gate retaining system is in an open, storable position.

5. A freight gate assembly according to claim 2, wherein the latching mechanism comprises a spring having one of its ends resting against a posterior end of the retractable tongue.

6. A freight gate assembly according to claim 3, wherein the joint mechanism comprises a cylindrical joint attached along one side to the second end of the gate rail, the cylindrical joint comprising a protuberance projecting from a side of the cylindrical joint opposite to its a juncture of the gate rail with the second gate rail end.

7. A freight gate assembly according to claim 6, wherein an edge of the joint protuberance is rounded to substantially correspond to the shape of the bottom of each of the notches; and wherein the notches are parallel to one another, and substantially rectangular in shape.

8. A freight gate assembly according to claim 6, wherein each of the tracks is generally C-shaped, and forms a generally C-shaped central channel; the cylindrical joint fitting closely into the C-shaped channel of the second track.

9. A freight gate assembly according to claim 8, wherein the C-shaped track comprises a substantially flat backbone comprising the spaced apart notches, and two arms projecting out from a top and bottom of the backbone.

10. A freight gate assembly according to claim 8, wherein the cylindrical joint has a generally flat top and bottom, the cylindrical joint being slidable along the channel.

11. A freight gate assembly for retaining freight in a trailer or van, the assembly comprising:

(a) a track system comprising at least two matching tracks, each of the tracks being affixable to opposite, longitudinal side walls of the trailer, each of the tracks comprising a longitudinally oriented channel and a plurality of spaced-apart, substantially same-sized notches, the notches being accessible from the channel; and (b) a freight gate restraining system comprising at least one adjustable sate rail, each gate rail having a first end comprising a latching mechanism for detachably latching the first end of the gate rail to a first one of the tracks by means of the notches in the first track, and an opposite, second end comprising a joint mechanism that is slidably movable along the second track by means of the notches in the second track;

wherein the adjustable gate rail is substantially perpendicular to the tracks when it is in a closed position far restraining freight; and each track is longer than the length of the gate rail and shorter than the length of the trailer;

wherein each of the tracks is generally C-shaped, and forms a generally C-shaped central channel; the joint mechanism fitting closely into the C-shaped channel of the second track; and the C-shaped track comprises a substantially flat backbone comprising the spaced apart notches, and two arms projecting out from the top and bottom of the backbone; and wherein, when the freight gate assembly is installed in a trailer, the track arms support the edges of a plurality of panels; the panels being substantially parallel to the longitudinal opposite side walls of the trailer and, when assembled, extending from a floor of the trailer to a ceiling of the trailer on opposite sides of the trailer.

12. A freight gate assembly according to claim 11, wherein the width of the gate rail is substantially the same as the width of the distance between edges of the arms of the C-shaped tracks.

13. A freight gate assembly for retaining freight in a trailer or van, the assembly comprising:

(a) a track system comprising at least two matching tracks, each of the tracks being affixable to opposite, longitudinal side walls of the trailer, each of the tracks comprising a longitudinally oriented channel and a plurality of spaced-apart, substantially same-sized notches, the notches being accessible from the channel; and (b) a freight gate restraining system comprising at least one adjustable gate rail, each gate rail having a first end comprising a latching mechanism for detachably latching the first end of the gate rail to a first one of the tracks, and an opposite, second end comprising a joint mechanism that is slidably movable along a second one of said tracks by means of the notches in the second track;

wherein the adjustable gate rail is substantially perpendicular to the tracks when it is in a closed position for restraining freight; and each track is longer than the length of the gate rail and shorter than the length of the trailer; and wherein the latching mechanism comprises a retractable tongue that is insertable in at least one of the notches of the first track, and a spring having one of its ends resting against a posterior end of the retractable tongue; and the tongue rests within a generally rectangular-shaped hollow in an end portion of the gate rail, with an anterior end of the tongue projecting from an aperture in the end portion of the gate rail; and an opposite end of the spring is depressible against a posterior wall of the hollow.

14. A freight gate assembly according to claim 13, wherein, when the latching mechanism is in a closed position, the retractable tongue extends into one of the notches in the first track.

15. A freight gate assembly according to claim 14, wherein, when the latching mechanism is in an open, unlatched position, the tongue is retracted into the end portion of the gate rail.

16. A freight gate assembly according to claim 13, further comprising a gate rail locking mechanism comprising a front end wall at a front end of the second track, the front end track wall comprising a central notch for receiving the latching mechanism tongue when the gate rail is in an open, storable position.

17. A freight gate assembly for retaining freight in a trailer or van, the assembly comprising:

(a) a track system comprising at least two matching tracks, each of the tracks being affixable to an opposite, longitudinal side wall of the trailer, each of the tracks comprising a channel along a longitudinal axis of the track and a plurality of spaced-apart, substantially same-sized notches; and (b) two corresponding gate arms, a first end of each of the gate arms comprising a joint mechanism that slidably fits into one of the track channels, a second end of each of the gate arms comprising a mechanism for detachably fastening the second ends of the two gate arms together for closing the freight gate assembly, each of the gate arm joint mechanisms comprising a protuberance that is removably insertable into each of the notches in a corresponding one of the tracks;

wherein each track is longer than the width across an interior of the trailer or van, and shorter than the length of the interior of the trailer or van; and wherein the gate arms are substantially perpendicular to the tracks when the freight gate assembly is in a closed position for restraining freight; and wherein each gate arm is storable within the channel of the corresponding track.

18. A freight gate assembly according to claim 17, wherein the fastening mechanism comprises a pin, and an end portion of each of the gate arms comprises an aperture for receiving the pin.

19. A freight gate assembly according to claim 17, wherein the fastening mechanism comprises a single bracket that fastens down over the two gate arms when the assembly is in a closed position, the bracket being hinged to the rear of a rearmost of the gate arms.

20. A freight gate assembly according to claim 17, wherein the joint mechanism comprises a cylindrical joint attached along one side to the second end of the gate rail.

21. A freight gate assembly according to claim 17, wherein the fastening mechanism comprises at least two matching brackets, one on each gate arm, each of the brackets closely fitting over the two gate arms when the assembly is in a closed position.

22. A freight gate assembly according to claim 19, further comprising a gate arm locking mechanism on a front end of each track for restraining each of the gate arms in a respective one of the track channels when the assembly is in an open, storable position.

* * * * *